(12) United States Patent
Kiest

(10) Patent No.: US 9,052,053 B2
(45) Date of Patent: *Jun. 9, 2015

(54) METHOD OF LINING A CONDUIT USING A SCRIM-REINFORCED PIPE LINER

(71) Applicant: LMK Technologies, LLC, Ottawa, IL (US)

(72) Inventor: Larry W. Kiest, Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/086,327

(22) Filed: Nov. 21, 2013

(65) Prior Publication Data

US 2014/0076447 A1   Mar. 20, 2014

Related U.S. Application Data

(63) Continuation of application No. 13/250,526, filed on Sep. 30, 2011, now Pat. No. 8,616,243.

(51) Int. Cl.
    *F16L 9/14*      (2006.01)
    *F16L 55/165*    (2006.01)

(52) U.S. Cl.
    CPC ........... *F16L 55/165* (2013.01); *F16L 55/1651* (2013.01); *F16L 55/1656* (2013.01)

(58) Field of Classification Search
    CPC .. F16L 55/1651; F16L 55/1656; F16L 55/165
    USPC .................. 138/98, 97, 124, 125; 405/150.1; 156/287; 264/269
    See application file for complete search history.

(56) References Cited

U.S. PATENT DOCUMENTS

| | | |
|---|---|---|
| 4,009,063 A | 2/1977 | Wood |
| 4,836,715 A | 6/1989 | Wood |
| 5,501,248 A | 3/1996 | Kiest, Jr. |
| 5,535,786 A | 7/1996 | Makela et al. |
| 5,868,169 A | 2/1999 | Catallo |
| 6,708,729 B1 | 3/2004 | Smith |
| 6,732,673 B2 | 5/2004 | Hughes, Sr. et al. |
| 6,923,217 B2 | 8/2005 | Smith |
| 6,932,116 B2 | 8/2005 | Smith et al. |
| 2003/0113489 A1 | 6/2003 | Smith |
| 2006/0090804 A1* | 5/2006 | Driver et al. ............... 138/98 |
| 2007/0113971 A1 | 5/2007 | Driver et al. |
| 2010/0243091 A1 | 9/2010 | D'Hulster |

FOREIGN PATENT DOCUMENTS

WO   9114896   10/1991

* cited by examiner

*Primary Examiner* — Patrick F Brinson
(74) *Attorney, Agent, or Firm* — Ryan N. Carter

(57) ABSTRACT

A method for repairing a conduit using a tube-shaped liner comprising a single layer of resin-absorbent fabric having a polymeric coating attached to an outer wall of the tube and a reinforcing layer connected to an inner surface of the tube. The liner is impregnated with a resinous material capable of curing and hardening and inverted under pressure into the conduit to be repaired such that the reinforcing layer is pressed against the interior of the conduit. The resinous material is allowed to cure and harden, creating a lining to the conduit. The single layer of fabric may be a non-woven material, such as a felt. The conduit to be lined may be a sewer pipe, and the reinforcing material may be a woven scrim. The woven scrim may be capable of preventing longitudinal stretch of the liner tube while allowing radial stretch.

20 Claims, 4 Drawing Sheets

METHOD OF LINING A CONDUIT USING A SCRIM-REINFORCED PIPE LINER

CROSS REFERENCE TO RELATED APPLICATIONS

This application is a Continuation Application of U.S. Ser. No. 13/250,526, filed Sep. 30, 2011, which is hereby incorporated in its entirety.

FIELD OF THE INVENTION

The present invention relates to a method and device for repairing a conduit using a scrim-reinforced pipe liner. More particularly, but not exclusively, it relates to a method and device for lining a pipe using a liner comprising a single layer of resin-absorbent fabric having a scrim layer associated with a first surface of the absorbent fabric and a coating associated with the opposite surface of the single layer of resin-absorbent fabric.

BACKGROUND OF THE INVENTION

Pipes and conduits have been restored for many years using a variety of rehabilitation and pipelining techniques. One such technique is referred to as "cured-in-place pipelining" or "CIPP." This technique includes taking a resin-absorbent sheet, impregnating the sheet with resin, placing the resin-impregnated sheet against the wall of a pipe, and allowing the resin to cure and harden. The resin-absorbent sheets are generally known as "liners."

Some liners used for cured-in-place pipelining applications use a layer of resin-absorbent fabric in association with a coating, reinforcing, and/or shielding layer. For example, U.S. Pat. No. 4,009,063 to Wood is one of the first patents issued for such liners. The '063 patent discloses a two-layered liner comprising a laminate of non-woven felt and plastics sheet material. The '063 patent also suggests the use of a second sheet of material in the form of a woven scrim web to reinforce the liner. The patent fails to disclose where the scrim web is incorporated into the liner. Furthermore, the '063 patent discloses a laminate for use with a so-called "pull-in-and-inflate" method that does not utilize an inversion process for installation. Inventor Eric Wood was also issued U.S. Pat. No. 4,836,715, which discloses a similar liner where a woven layer may be used as a reinforcing layer within sections of a felt layer. As such, this patent does not specifically disclose the placement of a scrim layer on the surface of the liner.

Another example of such liners are disclosed in U.S. Pat. No. 5,501,248 and U.S. Patent Application Number 2010/0243091, where the use of a polymeric coating reinforced with a scrim associated with a resin-absorbent fabric layer is described. Since the polymeric coating and scrim are attached or otherwise abut, these liners are subject to delamination of the polymeric coating from the liner after placement within a host pipe.

U.S. Pat. No. 5,535,786 to Mäkelä, et al discloses a pipe liner of various constructions where one or more felt layers are used in conjunction with a knitted reinforcement layer and an optional coating. Even though the several embodiments of this patent disclose a variety of configurations of the felt layer, reinforcement layer, and coating layer, there is no embodiment where the reinforcement layer is connected to one surface of a single layer of felt with a coating on the opposite surface.

U.S. Pat. No. 5,868,169 to Catallo discloses the use of a layer of reinforcing fibers and a layer of resin-absorbing material fixedly attached and positioned adjacent to the layer of reinforcing fibers so that the layers of resin-absorbing material, when saturated with resin, shield the layer of reinforcing fibers from water or other corrosive materials that contact the liner. The patent teaches that with conventional cured-in-place liners using fiberglass, the fiberglass fibers located on the inner and outer surfaces of the liner are exposed to the water and other corrosive materials. Due to capillary or wicking action, the water and other corrosive materials are absorbed into the tiny spaces adjacent to the exposed fiberglass fibers. The absorption of water and other corrosive materials enhances the expansion and contraction of the resin and fiberglass, thereby further deteriorating the bond between the resin and fiberglass. Corrosive reactions with the resin/fiberglass laminant also exacerbate the deterioration of the bond between the resin and fiberglass. Because of the wicking action, the space between the resin and fiberglass fibers becomes progressively larger and larger. In addition, as the space between the resin and a given fiber grows in size and length, previously unexposed fiberglass fibers adjacent to the exposed fibers become exposed to the water and other corrosive materials. Over time, the wicking of water and other corrosive materials into the laminant will destroy the bond between the resin and the fiberglass fibers. When this occurs, the reinforcing effects of the fiberglass is lost causing the liner to lose much of its structural strength, thereby ending the useful life of the liner prematurely. As with the Wood patents, the Catallo patent fails to teach the inversion of such a liner into a pipe during installation.

U.S. Pat. No. 6,732,763 to Williamson, et al. addresses many of the same problems as the '169 patent, but claims to additionally prevent stretch. U.S. Pat. No. 6,732,763 discloses a stretch-resistant liner for a pipe having a support sleeve positioned between two sealing sleeves. As the support layer is sandwiched between two sealing layers, the flexural strength of the cured liner is not enhanced because the reinforcement is placed close to the neutral plane of the liner.

Yet another liner used in cured-in-place pipelining having a layer of resin-absorbent fabric in association with a coating, reinforcing, and/or shielding layer is disclosed in U.S. Pat. No. 6,708,729 to Smith. This patent discloses a multi-layered liner construction where a scrim web is attached to a layer of resin-absorbent material to act as a reinforcing layer. An inner reinforcing layer comprising bundles of reinforcing fibers may be attached to the scrim web, folded over, and stitched along the edge to form a tube. A resin-absorbent layer or layers are wrapped about the inner reinforcing tubular layer and joined at the edges to form a tube. An outer reinforcing layer of reinforcing fiber bundles held together by longitudinal stitching is then wrapped around the resin-absorbent layer to form an outer tubular layer with the ends of the bundles of reinforcing fibers overlapping. The result is multi-layered liner with a scrim web near one surface of the liner and an impermeable coating near the opposite surface of the liner.

As such, problems remain in the art and a need exists for an improved method and means for repairing a pipe using a scrim-reinforced pipe liner.

BRIEF SUMMARY OF THE INVENTION

It is therefore a principal object, aspect, feature and/or advantage of the present invention to provide a device and method for providing a lining to a conduit, such as a sewer pipe, which improves over or solves the problems and deficiencies in the art.

Other objects, features, aspects, and/or advantages of the present invention relate to a device and method for lining a conduit where a liner coating is unlikely to delaminate from the cured product.

Further objects, features, aspects, and/or advantages of the present invention relate to a method of lining a conduit with a liner where the liner is flexible enough for inversion prior to placement within a pipe, yet is capable of providing enhanced flexural strength after the liner has cured.

Further objects, features, aspects, and/or advantages of the present invention relate to a new apparatus and method for lining a conduit where a scrim layer is used to reinforce a liner tube where the scrim allows for some radial stretching of the tube but prevents longitudinal stretch.

One aspect of the invention includes a method for providing a lining to a conduit where a single sheet of resin-absorbent fabric having a first surface and a second surface is provided. A reinforcing material is connected to the first surface of the single sheet of resin-absorbent fabric, and a polymeric coating is imparted to the second surface of the single sheet of resin-absorbent fabric. The single sheet of resin-absorbent fabric is formed into a tube such that the second surface is the outer surface of the tube. The tube is then inverted into the conduit under pressure so that the reinforcing material is pressed against the inner wall of the conduit. The method may include impregnating the sheet of fabric with a material capable of curing and hardening and allowing the material to cure and harden. The fabric may be a non-woven material, such as a felt. The conduit to be lined may be a sewer pipe, and the reinforcing material may be a woven scrim. The woven scrim may be capable of preventing longitudinal stretch of the liner tube while allowing radial stretch.

These and other objects, features, aspects, and/or advantages of the present invention will become apparent with reference to the accompanying specification and claims.

DETAILED DESCRIPTION OF THE PREFERRED EMBODIMENT

This invention relates to a method and device for repairing a conduit using a reinforced pipe liner. More particularly, but not exclusively, it relates to a method and device for lining a sewer pipe using a liner comprising a single layer of absorbent material having a scrim layer associated with a first surface of the absorbent material and a coating attached to the opposite surface of the absorbent material.

The following definitions of terms are employed throughout the specification and claims:

"Attached" is defined as having a mechanical attachment by fastening or joining

"Connected" is defined as associated with or considered as related. As used herein, the term "connected to" does not require physical attachment, rather simply an association or relationship.

"Fabric" is defined as any cloth made from yarn or fibers by methods such as weaving, knitting, felting, etc. It contemplated that the fabric be made of a material of any construction as long as the material is capable of absorbing a resin.

The terms "invert," "inversion," and "inversion process" are all meant to describe a method where a pipe liner is turned inside out, where what was the interior of the liner becomes the exterior. These terms are commonly used synonymously with the terms "evert" or "eversion."

"Layer" is defined as a portion of material covering or forming a part.

"Reinforcing material" is defined as a material that provides additional strength to a lining material before, after, or during curing of a resin.

"Scrim" is defined as a loosely woven fabric.

Figure 1:
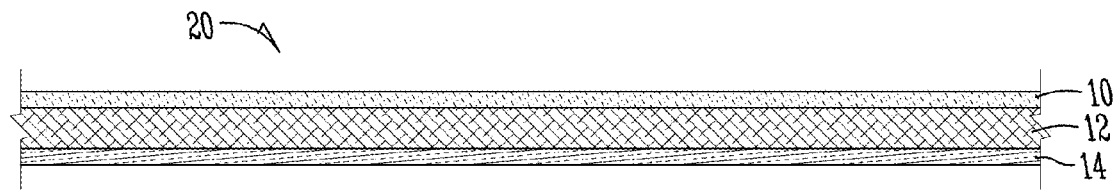
FIG. 1 is a sectional view of a material used to produce a liner according to one embodiment of the present invention where a reinforcing layer is connected to a surface of the liner opposite a coating layer.

Referring now to the drawings wherein like numerals refer to like parts, FIG. 1 is a sectional view of a material used to produce a liner according to one embodiment of the present invention. The liner 20 is shown as a reinforced liner for lining the interior of a conduit, such as a sewer pipe. The liner 20 includes three layers: a coating layer 10, a single layer of a resin-absorbent fabric 12, and a reinforcing layer 14. The coating layer 10 is attached to a first surface of the single layer of the resin-absorbent fabric 12 and the reinforcing layer 14 is connected to a second surface of the resin-absorbent fabric 12 opposite the first surface.

The single layer of resin-absorbent fabric 12 is preferably constructed of a non-woven material, such as felt. A non-woven material is generally a material having a porous sheet structure made from interlocking layers or networks of fibers, filaments, or filamentary structures. The fibers, filaments or filamentary structures may be directionally or randomly oriented and are bonded by friction, cohesion, or adhesion. While is preferred that the resin-absorbent fabric 12 be a non-woven material, the present invention contemplates that the single layer of resin-absorbent fabric 12 may also be a woven material. Woven materials are typically composed of yarns or threads running lengthwise in the material and filling threads interlaced with lengthwise threads at approximately right angles. It is also contemplated that the resin-absorbent fabric be a composite or combination of a plurality of fabrics (such as wovens and non-wovens) joined together to act as a single layer. It should be appreciated that the resin-absorbent fabric may be any other fabric capable of absorbing a resinous material capable of curing and hardening, including but not limited to layers of felt, linen, cotton, synthetic fibers, natural fibers, polymers, and blends.

Felt material is preferred because felt lends itself to great tolerances and variances in the manufacturing process. Felt may be easily needled or stretched, and it is commercially available in an array of different constructions. For instance, felt can be produced as a composite of fibers having various deniers. Adjusting the denier of the felt allows for certain fibers of a felt sheet to become substantially integrated with a polymeric coating. As such, molten polymers easily coat felt, as the fibers are readily incorporated into the polymer coating. This is especially true if the fibers of the felt are constructed of a material compatible with the polymer coating. Additionally, felt is easily produced in sheets of various densities and thicknesses. In applications where the polymer is a molten state during the application process, the polymeric coating may melt or otherwise incorporate a portion of the felt fibers into the coating. Therefore, a felt sheet having a substantial thickness and density should be used for the liner of this invention. The thickness should be chosen such that the liner has the capability of absorbing enough resinous material to create a lining within a conduit in conformance with applicable ASTM standards, such as ASTM-F1216.

The first surface of the layer of resin-absorbent fabric 12 includes a polymeric coating 10, comprising an impervious polymeric coating or film, preferably a thermoplastic polyurethane ("TPU"). The coating 10 may be made of other polymeric materials, such as polyethylene (PE) or polyvinyl chloride (PVC). However, the polymeric coating 10 may be any other polymer that may be coated onto a resin-absorbent fabric. For example, some polymers considered for use with this invention include polyurethanes, polyethylenes, polyvinylchlorides, butyls, rubbers, cellophane nitrates, neoprenes, polyester, or combinations thereof. A TPU is preferred because TPU is an example of a polymeric material that may be left inside the conduit after the lining process is complete, acting as a coating to the interior of the conduit. Additionally, a certain grade of TPU may be chosen to coat a specific type of conduit. TPU is commercially available in two different grades: ester grade and ether grade. An ether grade material is best suited for applications where the conduit transports water and other aqueous effluents, as ether grade thermoplastic material does not degrade in aqueous conditions. Ester grade material is best suited for applications where the conduit transports natural gas, oil, or other organic effluents, as ester grade thermoplastic material does not degrade in the presence of organic materials or solvents. Additionally, TPU is compatible for adhesion to many resinous materials capable of curing and hardening. For instance, it has been found that a TPU coating easily adheres to most epoxy resins after curing and hardening of the epoxy. As such, it is envisioned that many other resinous materials capable of curing and hardening may be utilized with an array of polymeric coating materials that provide enhanced bonding capabilities of the coating to the liner. As such, the resinous material capable of curing and hardening may be a thermoset resin, and ambient cure resin, an ultraviolet curing resin, a polyester, a vinyl ester, an epoxy, or any other resin capable of curing and hardening.

The polymeric coating 10 is attached to the single layer of resin-absorbent fabric 12. The polymeric coating 10 may be attached by any known method of attaching a polymeric film to a fabric, including but not limited to adhesion, extrusion, dip/immersion coating, kiss coating, knife coating, spraying, or bar coating. It is noted that a method may be utilized that maximizes the strength of the bond of the polymeric coating 10 to the single layer of resin-absorbent fabric 12 for applications where the coating 10 remains inside the pipe to act as a coating to the cured liner 20.

The polymeric coating 10 on the liner 20 may be used to ensure a leak-free tube and provide a slick surface to the lining after the conduit is lined. As such, the polymeric coating must have a thickness such that the liner is impermeable, yet remains flexible enough to negotiate bends in the pipeline and allow the lining tube to be inverted into the pipeline under fluid pressure. If the polymeric coating 10 is too thick, the liner 20 will be unable to undergo an inversion process into the conduit to be repaired. The polymeric coating 10 should have a thickness of about 2-50 mils, preferably 4-10 mils. It should be noted that the thickness of the polymeric coating 10 should not be so thin as to become weak, as the coating provides a smooth surface for effluents to travel through the conduit with little resistance due to friction, thus increasing the flow rate observed within the lined conduit.

Figure 2A:
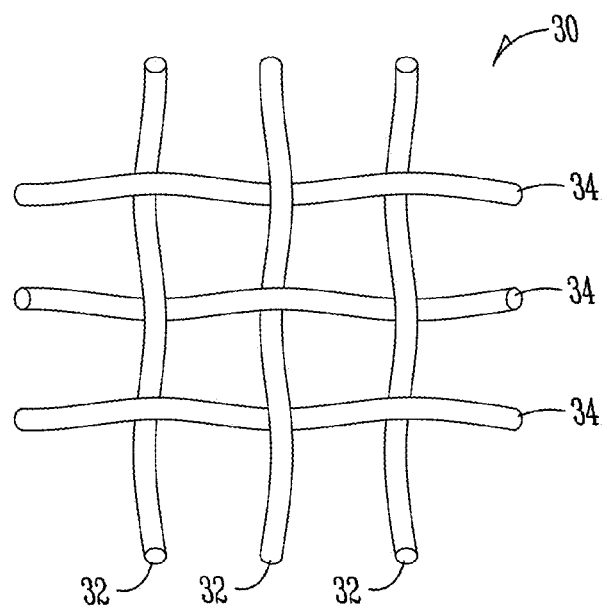
FIG. 2A is a perspective view of a woven scrim material.
Figure 2B:
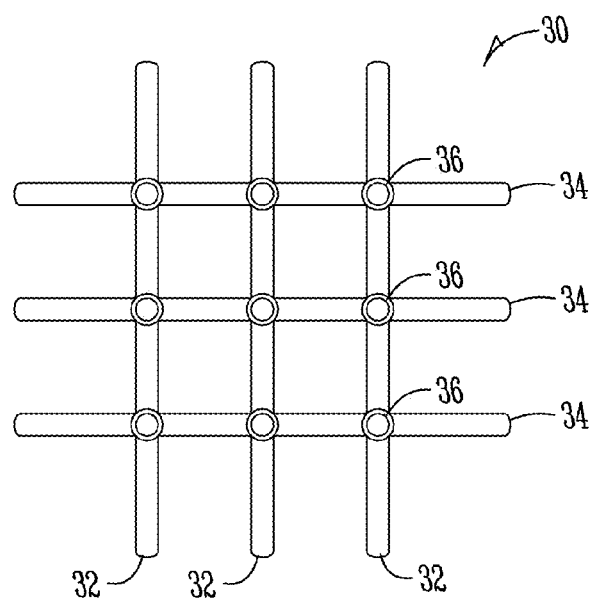
FIG. 2B is a perspective view of a reinforcing layer of the present invention including locking members.

The second surface of the layer of resin-absorbent fabric 12 includes a woven or knitted reinforcing layer 14 connected or attached thereto. The reinforcing layer 14 may be described as a woven or knitted sheet, capable of providing reinforcement to the liner 20 once connected to the single resin-absorbent material 12. In some embodiments, the reinforcing layer 14 may be a knitted material. The knitted material may be capable of allowing stretch in one direction of the material, but not allowing stretch in the other direction of the fabric, as shown for example in U.S. Pat. Nos. 5,732,573 and 6,804,978. In several embodiments, a scrim is used as the reinforcing layer. A scrim 30 may be described as a woven sheet generally including a warp 32 and a weft 34, as shown in FIGS. 2A and 2B. The intersection of the warp 32 and the weft 34 may be 90 degrees or it may be less or more than 90 degrees. The intersection of the fibers that comprise the scrim may be configured in any way, as long as the scrim provides some reinforcement to the fabric in two directions, such as the x- and y-axis of a flat sheet. Preferably, the reinforcing layer 14 will provide reinforcement or stretch-resistance along a first direction of the sheet, and less reinforcement or stretch-resistance in the opposite direction of the sheet.

In some embodiments, it may be advantageous to utilize a reinforcing layer 14 capable of absorbing an adhesive or the like. In such an embodiment, the reinforcing layer 14 may be attached to the single layer of resin-absorbent material 12 by an adhesive carried on the reinforcing layer 14. In other embodiments, it may be advantageous to include locking members 36 associated with the scrim 30 that encourage a mechanical lock between the liner and the scrim before and/or after curing of the resin, as shown in FIG. 2B. Locking members 36 may be generally described as projections, indentations, or irregularities connected or attached to the reinforcing layer 14 or scrim 30 that embed within the single layer of resin-absorbent fabric and/or the material capable of curing and hardening. Locking members 36 are illustrated as rings, but locking members having a variety of shapes such as hooks or loops may be used to create a mechanical bond between the scrim and the single layer of resin-absorbent material before installation. After installation, the locking members 36 may be used to create a mechanical bond between the scrim and the material capable of curing and hardening.

Figure 3:
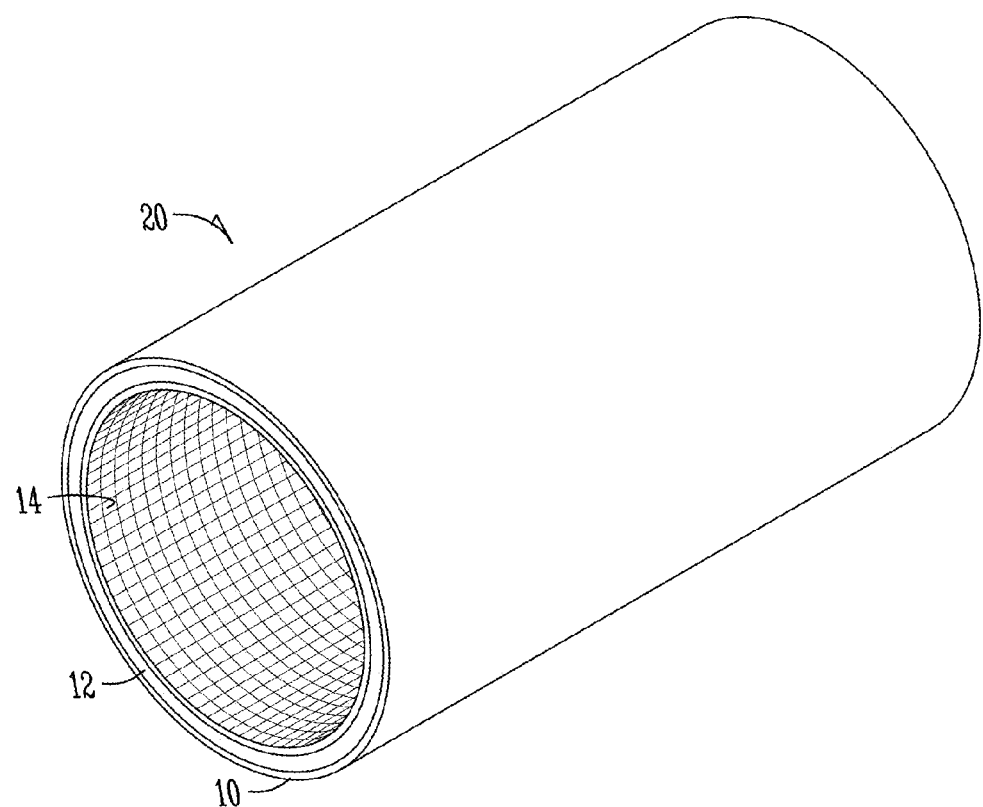
FIG. 3 is a perspective view of the material used to produce a liner in FIG. 1, showing where the material is placed into a liner tube prior to inversion within a conduit to be lined.

When the liner 20 is placed into the form of a tube, as shown in FIG. 3, the reinforcing layer 14, depicted as a woven scrim, should provide reinforcement in the longitudinal and radial directions of the tube. The reinforcing layer 14 should be on the interior of the tube. The scrim may be constructed of strands, yarns, strings, or the like. The scrim may be attached to the resin-absorbent material by needling, stitching, adhering using an adhesive, or the like. A needling process is preferably used to connect the scrim to the resin-absorbent fabric by punching small needles through the fabric, lifting small, random fibers of the resin-absorbent material above the scrim, and locking the scrim to the surface of the resin-absorbent material. Utilizing a needling process to connect the scrim to the single layer of resin-absorbent fabric 12 may result in an embodiment where the reinforcing layer 14 is attached to the resin-absorbent fabric 12 for the entire length of the fabric. Alternatively, the scrim may be attached near the ends of the tube, allowing the scrim to move freely across the body of the liner 20 prior to installation.

In yet even further embodiments, the reinforcing layer 14 or scrim may comprise two different materials in order to allow varying degrees of pre-cure stretch or post-cure strength in different directions of the liner 20. The first material may comprise an elastic yarn or thread that allows stretch in a first direction of the fabric, where the first material may enhance the mechanical properties of the cured liner to some degree. The second material may comprise a non-stretching material that limits stretch in a second direction of the fabric, and may enhance the mechanical properties of the cured liner. The mechanical properties that may be enhanced include tensile strength, tensile modulus, flexural strength, or flexural modulus. It is envisioned that many different materials used for the reinforcing layer 14 may enhance the mechanical properties of the cured liner.

Figure 4:
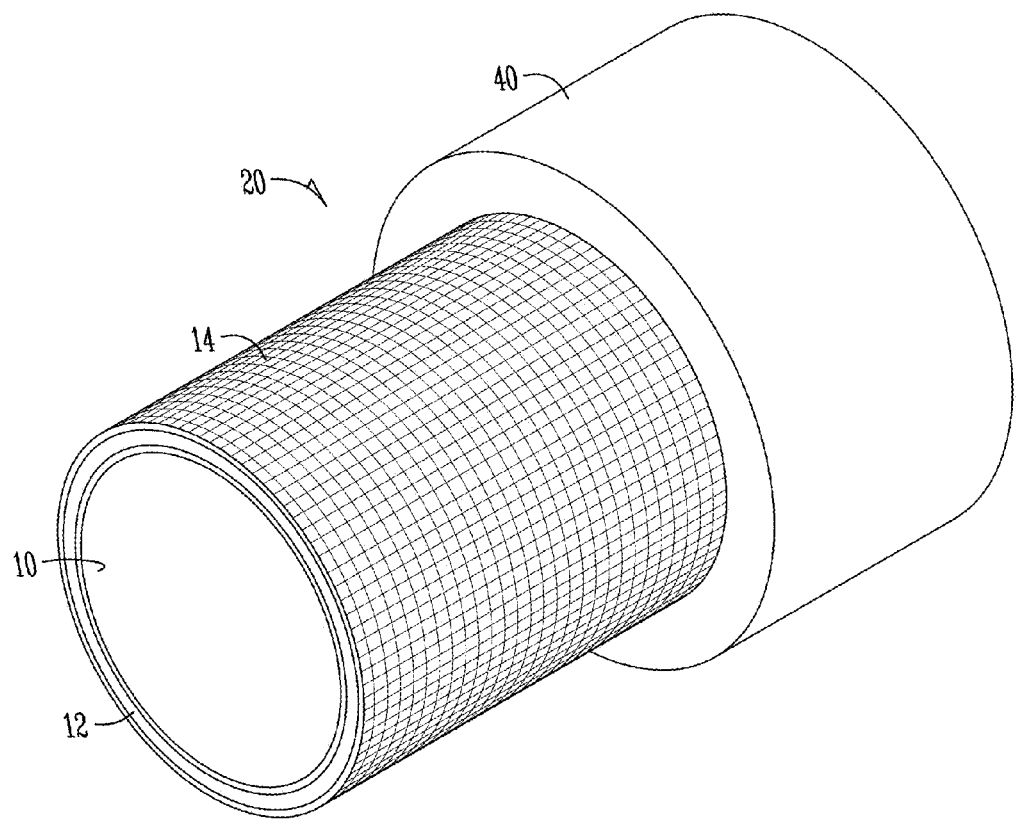
FIG. 4 is a perspective view of the liner tube of FIG. 3, showing where the liner tube has been inverted within a conduit to be lined and where sections of the liner have been cut away to show the relationship of the components of the liner within the conduit.
Figure 5:
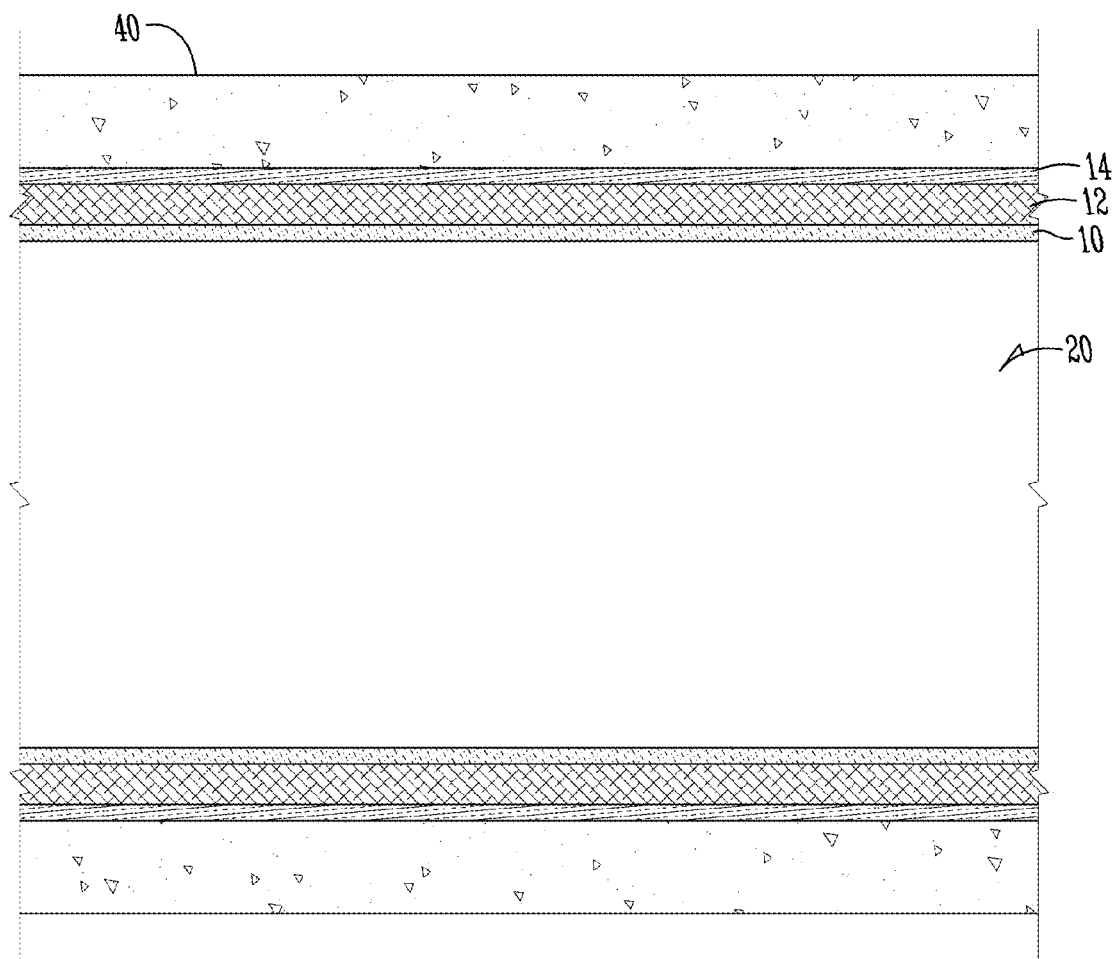
FIG. 5 is a sectional view of the liner of the present invention within a conduit.

It is preferred that the liner be flexible enough to be inverted into a conduit under pressure. It is preferred that when the liner is installed, the polymeric coating is the new conduit interior, and the scrim is adjacent to the walls of the conduit. It is noted that in some instances, the scrim may not physically touch the conduit wall, as resin will fill the area between the scrim material and the conduit wall. FIG. 4 illustrates a perspective view where the liner 20 of FIG. 3 has been inverted within a conduit 40 to be lined, and sections of the conduit 40 and sections of the liner 20 have been cut away to show the relationship of the components of the liner 20 within the conduit 40. It is easily seen that the reinforcing layer 14, depicted as a scrim, is placed against the inner wall of the conduit 40 to be lined. The single layer of resin-absorbent fabric 12 is also expanded against the wall of the conduit 40 after a resinous material capable of curing and hardening is applied to the fabric. This arrangement is also depicted in the sectional view provided in FIG. 5.

The inversion process may be performed using any method known in the art. For instance, a control rope or line may be attached to a closed first end of the liner. The control rope or line acts to provide a controlled inversion and to alert an installation technician when the liner is fully inverted within the conduit. The opposite second end of the liner may be attached to a unit that applies pressure to the exterior of the liner, so that the lining assembly may invert into the conduit to be lined. Such a unit is generally called an "inversion vessel" or a "shooter." The second end of the liner may be attached to a hose of the inversion vessel after pulling the closed first end of the liner into the inversion vessel by the rope or line. The opposite second end may be attached to the hose by banding, taping, cam locks, or the like. The inversion vessel also includes a fluid line that supplies fluid pressure to the inversion vessel. The fluid may be hydraulic fluid, water, air, and/or other fluids. However, the fluid is preferably air. The hose is aligned with an access bore of the conduit to be lined, pressure is supplied to the inversion vessel via the fluid line, and the lining assembly is inverted into the conduit to be lined. Additionally, the methods of the present invention may be utilized to line lateral sewer pipes or the junction of a main and lateral sewer pipe, utilizing methods such as those described in U.S. Pat. Nos. 6,039,079 and 6,994,118, which are hereby incorporated by reference in their entireties.

There are several advantages of using the methods associated with a liner of the construction described above. First, flexural strength is enhanced in the cured liner. Since the reinforcing materials or scrim is outside of the neutral plane, the material that comprises the scrim will increase the ability of the cured liner to resist deformation under load during the flexural test. This is because the reinforcing fibers or scrim are the "extreme fibers," or the inner and outer edges of the cured liner sample. When the cured liner material is bent, only the extreme fibers are at the largest stress. Therefore, if those fibers are free from defects, the flexural strength will be controlled by the strength of those intact fibers (the strength of the material comprising the scrim). However, if the scrim lies in the neutral plane of the liner, then all of the fibers in the material are at the same stress, and failure will initiate when the weakest fiber reaches its limiting tensile stress. Many of the known prior art liners utilize a construction where the scrim (if present) lies within the neutral plane of the liner.

Another advantage of placing the scrim on the side of the resin-absorbent material opposite the polymeric coating is the fact that placing the coating and the scrim on the same side may lead to delamination of the coating from the cured liner. Since the scrim will generally limit the stretch of the material in different directions, the scrim acts as the only limiting force because the polymeric coating and resin-absorbent material are generally flexible or capable of stretching. Therefore, while the liner is inflated and/or placed against the walls of the conduit, the resin-absorbent material and the polymeric coating stretch while the scrim does not. Since many of the prior art disclosures include some structure where the coating and scrim are attached, this invention avoids the delamination problem by completely dissociating the polymeric coating from the scrim.

The liner as disclosed may be used to provide a lining to the interior of a conduit to be repaired or sealed, preferably a low-pressure pipe, such as a sewer pipe. However, it is envisioned that the liner of the present invention may be used to seal or repair many other types of conduits, including but not limited to other low-pressure conduits, such as an HVAC duct; a pressurized pipe, such as a potable water pipe or gas line; or a conduit for the transport of other materials, such as electrical conduit.

In operation, the methods and liners of the present invention include the following: a single sheet of resin-absorbent fabric having a first surface and a second surface is provided. A reinforcing material or layer is connected to the first surface of the single sheet of resin-absorbent fabric, and a polymeric coating is imparted to the second surface of the single sheet of resin-absorbent fabric. The single sheet of resin-absorbent fabric is formed into a tube such that the second surface is the outer surface of the tube. The single sheet of fabric is impregnated with a resinous material capable of curing and hardening. The tube is inverted into the conduit under pressure so that the reinforcing layer or material is pressed against an inner wall of the conduit. The resinous material capable of curing and hardening is allowed to cure and harden, providing a new interior lining to the conduit to be repaired.

The result of practicing the embodiments and methods of this invention is a lining to a conduit where a coating is attached to the lining within the conduit. The coating provides a smooth interior surface for effluents to travel through the conduit with little resistance due to friction. Additionally, the liner used to form the conduit lining is not constricted during installation, therefore very few bulges or bunches will appear in the cured conduit lining. Additionally, the coating will not separate or fall into the conduit, as practicing the methods of this invention allows the coating to remain within the lined conduit when optimal materials are chosen for the coating and resin-absorbent fabric.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A liner for providing a lining to an interior of a conduit comprising:

a resin absorbent material having a first surface and an opposite second surface;

a reinforcing material having a first surface and an opposite second surface, said first surface of the reinforcing material attached to the first surface of the resin-absorbent material and the second surface of the reinforcing material forming an outer surface of the liner; and an impermeable coating attached to the second surface of the resin-absorbent material.

2. The liner of claim 1 wherein the reinforcing material is positioned adjacent the interior of the conduit when the liner is positioned within the conduit.

3. The liner of claim 1 wherein the resin-absorbent material comprises felt.

4. The liner of claim 3 wherein the felt comprises a non-woven material.

5. The liner of claim 3 wherein the impermeable coating comprises a polymer.

6. The liner of claim 5 wherein the polymeric coating is fluid impervious.

7. The liner of claim 6 wherein the coating has a thickness between 2-50 mils.

8. The liner of claim 5 wherein the reinforcing material comprises a woven scrim.

9. The liner of claim 5 wherein the reinforcing material comprises a knitted sheet.

10. The liner of claim 1 wherein the reinforcing material is attached to the first surface of the resin-absorbent material by needling, and the impermeable coating is attached to the second surface of the resin-absorbent material by an adhesive.

11. A method of lining a conduit with a liner being made of a resin-absorbent material having a first surface and an opposite second surface, a reinforcing material attached to the first surface of the resin-absorbent material, and an impermeable coating attached to the second surface of the resin-absorbent material, the method comprising:

impregnating the liner with a material capable of curing and hardening;

inverting the liner into the conduit such that the reinforcing material is pressed against an inner wall of the conduit; and allowing the material to cure and harden.

12. The method of claim 11 wherein the step of inverting the liner into the conduit comprises inflating the liner.

13. The method of claim 11 wherein the single sheet of resin-absorbent fabric comprises a single layer of felt.

14. The method of claim 13 wherein the reinforcing material is attached to the single layer of felt by a needling process.

15. The method of claim 14 wherein the reinforcing material allows radial stretch of the tube and prevents longitudinal stretch of the tube.

16. A method of preparing a liner that is to be used to line a conduit by inverting the liner at least partially into the liner, the method comprising:

providing a single sheet of resin-absorbent fabric having a first surface and an opposite second surface;

connecting a reinforcing material to the first surface of the single sheet of resin-absorbent fabric;

imparting a polymeric coating to the second surface of the single sheet of resin-absorbent fabric; and forming the resin-absorbent fabric, reinforcing material, and polymeric coating into a tube;

wherein the tube is inverted into the conduit such that the reinforcing material is pressed against an inner wall of the conduit.

17. The method of claim 16 wherein the single sheet of resin-absorbent fabric comprises a single layer of felt.

18. The method of claim 17 wherein the step of connecting the reinforcing material to the felt comprises a needling process.

19. The method of claim 16 wherein the step of imparting a polymeric coating to the second surface of the resin-absorbent fabric comprises:

a. adhesion;
b. extrusion;
c. immersion coating;
d. kiss coating;
e. knife coating;
f. spraying; or
g. bar coating.

20. The method of claim 19 wherein the polymeric coating is flexible such that the liner is able to bend with bends in the conduit.

* * * * *